US 6,966,162 B2

(12) United States Patent
Viaud et al.

(10) Patent No.: US 6,966,162 B2
(45) Date of Patent: Nov. 22, 2005

(54) DEVICE FOR WRAPPING A BALE WITH A WRAPPING SHEET AND INCLUDING A CONTROL UNIT RESPONSIVE TO WRAPPING CONDITION SENSOR(S)

(75) Inventors: Jean Viaud, Gray (FR); Stéphane Biziorek, Champlitte (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/797,406

(22) Filed: Mar. 10, 2004

(65) Prior Publication Data
US 2004/0182043 A1 Sep. 23, 2004

(30) Foreign Application Priority Data
Mar. 22, 2003 (DE) ................... 103 12 897

(51) Int. Cl.[7] ........................ B65B 57/02; A01F 15/08
(52) U.S. Cl. ..................... 53/64; 53/118; 53/587; 100/4; 100/5; 56/341
(58) Field of Search ............................ 53/118, 67, 116, 53/587, 64, 69, 505; 100/4, 5; 56/341; A01F 15/07, A01F 15/08

(56) References Cited

U.S. PATENT DOCUMENTS

| 4,697,402 | A | * | 10/1987 | Anstey et al. ................. 53/506 |
| 4,779,526 | A | * | 10/1988 | Frerich et al. ................. 100/5 |
| 5,152,123 | A | * | 10/1992 | Viaud et al. ................... 53/508 |
| 5,349,806 | A | * | 9/1994 | Swearingen et al. .......... 56/341 |
| 5,568,716 | A | * | 10/1996 | Kluver et al. ................. 53/399 |
| 5,722,214 | A | * | 3/1998 | Spatafora ....................... 53/53 |
| 5,916,109 | A | * | 6/1999 | Espinosa ...................... 53/397 |
| 5,996,314 | A | * | 12/1999 | Pennini et al. ............... 53/399 |
| 6,209,450 | B1 | * | 4/2001 | Naaktgeboren et al. ....... 100/4 |

FOREIGN PATENT DOCUMENTS

DE    10011158 A1    9/2001

OTHER PUBLICATIONS

U.S. Appl. No. 10/462,045, filed Jun. 13, 2003.

* cited by examiner

*Primary Examiner*—Stephen F. Gerrity
*Assistant Examiner*—Paul Durand

(57) ABSTRACT

The invention suggests a device for wrapping a bale with a wrapping sheet, which comprises one or more sensors that detect whether the bale is wrapped properly with the wrapping sheet. A baling press is equipped with such a wrapping device as well as a control or regulating unit (ECU) that receives a signal from the one or more of the sensors and acts to interrupt the wrapping of a bale in the event the signal indicates an improper wrapping process is underway.

7 Claims, 1 Drawing Sheet

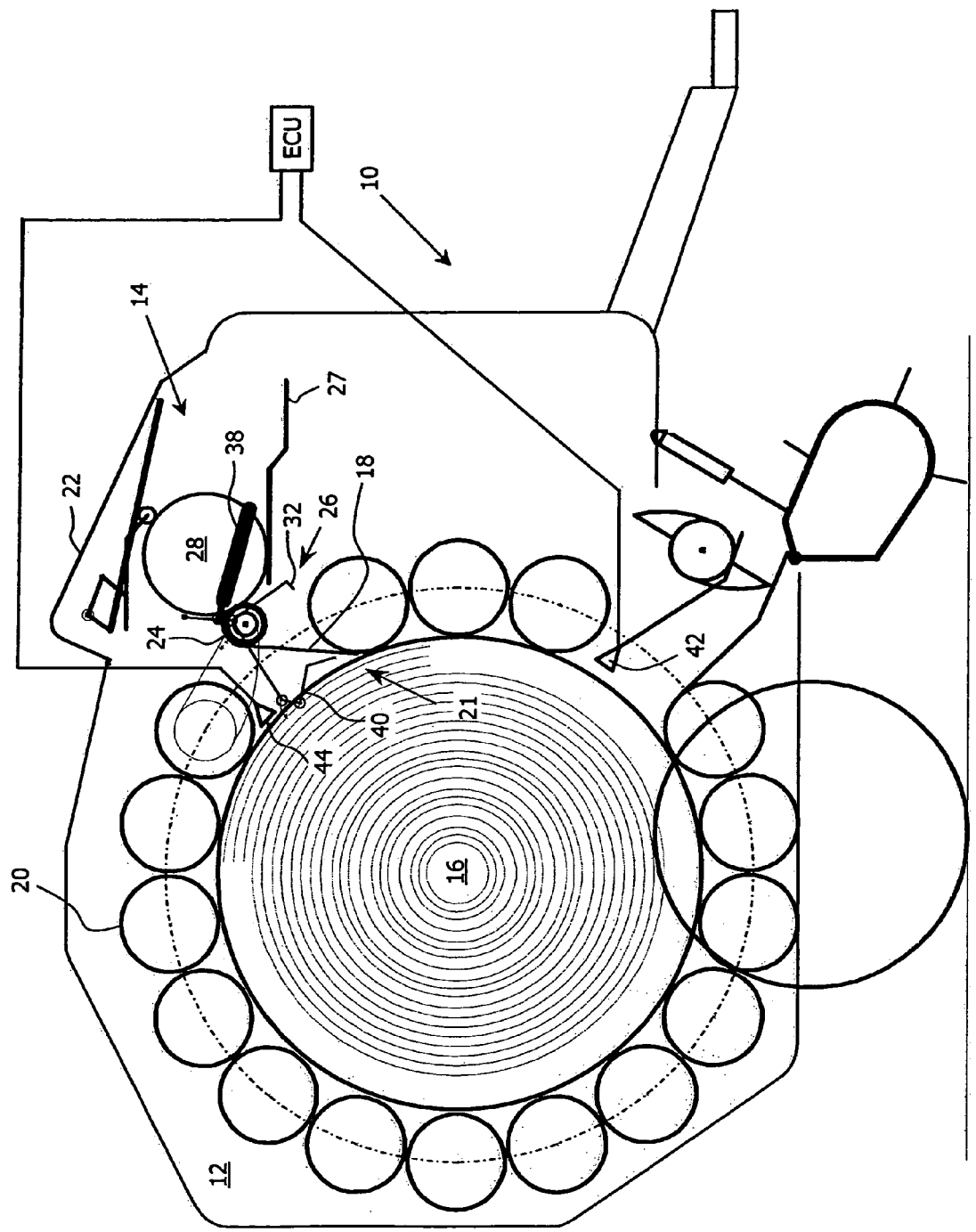

DEVICE FOR WRAPPING A BALE WITH A WRAPPING SHEET AND INCLUDING A CONTROL UNIT RESPONSIVE TO WRAPPING CONDITION SENSOR(S)

FIELD OF THE INVENTION

The invention relates to a device for wrapping a bale with a wrapping sheet, comprising elements that feed the wrapping sheet to the bale, a baler comprising such a device as well as a sensor of a control or regulating system of a device for wrapping a bale with a wrapping sheet.

BACKGROUND OF THE INVENTION

DE-A1-100 11 158 reveals a baler with a device for wrapping a bale with a wrapping sheet. The wrapping sheet is pulled off a supply reel by means of an advancing roller. The device comprises a sensor, which detects whether the wrapping sheet wraps around the advancing roller and is thus not properly fed to the bale. If the sensor detects a malfunction, the wrapping process is suspended.

SUMMARY OF THE INVENTION

The object of the invention is to resolve the problem that a device for wrapping a bale suspends the wrapping process only if the wrapping sheet has already wound around the advancing roller. If however the wrapping sheet is becoming backed up, no malfunction is detected and the system can become jammed.

This problem is resolved by providing a device for wrapping a bale, which determines whether a wrapping sheet is present on the surface of the bale. This is an indication that the bale wrapping process is progressing properly and the wrapping sheet is not wrapped around the components of the baling press or is experiencing an undesirable obstruction. If the sensor detects that no wrapping sheet is present although the wrapping process was initiated after completion of the baling process, then the wrapping process can be interrupted and the wrapping sheet does not continue to build up and also cannot become jammed.

The elements that feed the wrapping sheet to the bale can be, for example, an advancing element or an advancing roller or cylinder, which pulls the wrapping sheet off a supply device, for example in the form of a reel. The use of a pressing element is also conceivable, which would move or press the wrapping sheet to the bale at the beginning of the wrapping process so the wrapping sheet can be conveyed and thus be pulled off the supply device. Beyond that or apart from that, the pressing elements can also contain a guiding element or other and/or additional transport or conveying elements.

If the sensor is provided downstream from the wrapping sheet feed location, it is possible to detect already shortly after the start of the wrapping process whether the wrapping process is taking place properly and whether the bale is being wrapped with the wrapping sheet. The term "downstream" from the wrapping sheet feed location should be understood to mean that the sensor is arranged shortly behind the point at which the wrapping sheet reaches the bale.

The sensor, however, can also be provided upstream from the wrapping sheet feed location, wherein the term "upstream" should be interpreted to mean that the sensor, in reference to the rotational direction of the bale, is arranged just prior to the location where the wrapping sheet is fed. If the sensor is installed here, it can detect whether a first layer of the wrapping sheet has been placed around the bale. If this is the case, the risk of the wrapping sheet being fed incorrectly or becoming jammed, etc., during further wrapping of the bale is very small.

If one sensor is provided downstream and another sensor provided upstream from the wrapping sheet feed location, the above-described benefits can be combined and it can be detected both whether the wrapping operation started properly and whether the first layer of wrapping material has been applied to the bale.

As a function of the sensor signal(s) supplied by the sensor(s) the supply of wrapping sheet to the bale can be controlled such that the feeding of wrapping sheet is interrupted if it is detected that the wrapping process is not conducted properly. For this purpose, it is possible that the elements no longer feed wrapping sheet and/or that the bale no longer rotates and thus no wrapping sheet, which was seized but not placed properly on the surface, is pulled off the supply device.

The sensor signal can, for example, activate a display or a visual and/or acoustic warning indicator, which indicates to an operator the malfunction of the wrapping process so that the operator can interrupt the wrapping operation. The sensor or the sensors however can also work in conjunction with a preferably electric or electronic control or regulating device. Such control or regulating devices are frequently already provided on baling presses or on vehicles with which balers are pulled so as to control and/or regulate additional baler functions. This control or regulating device can receive and process the sensor signal or sensor signals so that the wrapping process can be automatically suspended in case of a malfunction. The control or regulating device also enables a time component to be included, for example in such a way that the sensor signal or the sensor signals are determined after specified time intervals after the start of the wrapping operation. The time intervals should be selected such that when the system functions properly it is to be expected that the wrapping sheet has already been applied to the bale in the respective location. For this, the rotational speed of the bale or its revolutions can be taken into consideration.

The sensor can be a sensor of any suitable kind. When using two or more sensors, it is also possible to combine different types of sensors. For example, mechanical sensors, ultrasound, infrared, proximity sensors, etc., can be employed. In particular the use of optical sensors, especially a color or contrast sensor, offers the additional benefit that the actual rotating speed of the bale can be determined in connection with markings or different colors, etc., which are provided at or on the wrapping sheet. This speed can be compared, for example, to the theoretical rotating speed, which is determined by the speed of the power take-off shaft of the driving vehicle, thus allowing conclusions of the bale's slippage. This in turn allows the wrapping sheet supply or the duration of the wrapping process, etc., to be adjusted.

In a conventional baling press the sensors are directed at a circumferential surface of the bale. However it is also conceivable to provide sensors that detect whether, in the case of appropriately designed balers, the lateral surfaces of the bale are also covered with the wrapping sheet. Moreover, sensors can be provided, which are directed at the edges of the bale and for example detect whether a wrapping sheet of a corresponding shape has been placed over the edges of the bale.

A device for wrapping a bale can be used in the industry on baling presses that form bales from paper, waste products, textile materials, etc. Such a device however is also particularly suited for use in an agricultural baler for bales consisting of agricultural crops since these are generally attached to a tractor and have to be monitored by the operator of said tractor. Malfunctions of a wrapping device are difficult for an operator of a towing tractor to detect and are frequently not noticed until the bale is ejected.

A sensor for a control or regulating device of a device for wrapping a bale can also be retrofitted on such a device or be made available as a spare part. This is easily possible since the sensor detects whether the wrapping sheet is present on a surface of the bale. It is therefore not necessary to place the bale on certain components of the device or modify components such that they work in conjunction with the sensor or are suited to accommodate it.

BRIEF DESCRIPTION OF THE DRAWINGS

The drawing represents an exemplary embodiment of the invention, which is described more closely in the following.

The sole FIGURE is a schematic right side view of a large round baler.

DESCRIPTION OF THE PREFERRED EMBODIMENT

Referring now to the drawing, there is shown a large round baler 10 of essentially conventional design having a baling chamber 12. Beyond that, in accordance with the present examples, a device 14 is provided for wrapping a bale 16, that has been formed in the baling chamber 12, with a wrapping sheet 18.

The baler 10 can be of a familiar design, i.e., wherein the baling chamber 12 is of constant or variable size, which is surrounded exclusively, or in combination, by belts, chains, or, as shown in the embodiment, by rollers 20.

The baler 10 can be used in agriculture for forming bales 16 from crops, such as e.g. straw, hay or grass. A use in industrial areas however is also conceivable.

The device 14, in the present embodiment, is provided on the front of the baler 10. The wrapping sheet 18 is fed through a gap between two adjacent rollers 20, which defines a wrapping sheet feed location 21 to the baling chamber 12, from where it is conveyed by the rotationally offset bale 16. The device 14 can be arranged in a central area of the baler 10 or also in front of or above the baling chamber 12.

The bale 16 is bound by means of the wrapping sheet 18, thus preventing it from falling apart after leaving the baler 10. The wrapping sheet 18 can be a film, net, tissue, paper or the like.

The device 14 comprises a housing 22, feed elements 24 that feed the wrapping sheet 18 to the bale 16 or, for example, an advancing element designed as an advancing roller and a severing device 26. The housing 22 contains a floor 27, on which the wrapping sheet 18 is stored as a reel 28 or supply device. The floor 27 can also be designed such that it holds several reels 28 and/or contains steps or troughs to secure their storage.

The advancing element or the devices 24 are included on its circumferential surface with a coating with a high coefficient of friction and can be rotationally offset. The rotation initially aids in pulling the wrapping sheet 18 off the reel 28 and in building up tension during the wrapping process due to a restrained rotating motion. The reel 28 is located above the resting surface of the floor 27 and, in its operating state, rests against the devices 24 with an area that corresponds roughly to a 6 to 9 o'clock position. The devices 24 pull the wrapping sheet 18 off the reel 28 and guide it through the gap or feed location 21 between the adjoining rollers 20 into the baling chamber 12. During proper operation, the cooperative action of the rotating bale 16 and the bale-forming rollers 20 results in the wrapping sheet 18 being carried along by the rotating bale 16 so that the bale 16 becomes wrapped by the sheet 18.

The severing device 26 comprises a blade 32, which is pivotably attached in order to enter the path of the wrapping sheet 18 and sever it or effect a tearing when the wrapping operating is completed. Swiveling of the blade 32 is accomplished with a hydraulic motor 38, which is actuated by a familiar controller, such as for example, an electric or electronic control or regulating device ECU.

In the present example, a guiding device 40 is pivotably provided, which guides the wrapping sheet 18 towards the bale 16. Such a guiding device 40 is revealed in U.S. patent application Ser. No. 10/462,045 filed 13 Jun. 2003.

Beyond that, two sensors 42 and 44 are provided in the baling chamber 12 in areas adjacent the rollers 20 arranged about the bale 16. The first sensor 42 is provided downstream from the wrapping sheet feed location 21, for example in the area where the wrapping material is fed. The second sensor 44 is arranged upstream from the wrapping sheet feed location 21 or in an area located behind the wrapping sheet supply area.

The sensors 42 and 44 each detect whether the bale 16 is wrapped with the wrapping sheet 18 in the respective area or whether, for example, as a consequence of a malfunction or insufficient wrapping sheet 18 on the supply device 28, no wrapping of the bale 16 with the wrapping sheet 18 is taking place.

Both sensors 42 and 44 are connected to the control or regulating device ECU such that they transmit sensor signals, which the unit can process, and based on which the wrapping process of the bale 16 with wrapping sheet 18, can be controlled or regulated.

The sensors 42 and 44 can be, for example, optical sensors, mechanical sensors, distance sensors, such as ultrasound sensors or proximity sensors, light barriers, infrared sensors or any other suitable type of sensor. A combination of different sensor types is also possible.

Particularly suited are optical sensors that respond to changes or differences in color or contrast. Such sensors beyond that make it possible, with a corresponding design of the wrapping sheet 18, to determine the length of unwound wrapping sheet. For example, the wrapping sheet 18 may be provided with different colors, markings or the like at specific intervals. Moreover, it allows conclusions of the actual rotating speed of the bale by conducting parallel to this a time recording or measurement process.

The following shall explain the function of the wrapping device 14 in more detail.

When the formation of the bale 16 in the baling chamber 12 has been completed, which is detected in a known fashion with a sensor (not shown), which determines for example mechanically or visually the size of the bale 16, the device 14 is activated. This occurs when the control or regulating device ECU selects the hydraulic motor 38 and moves it into the depicted retracted position.

In this position, the devices 24 are set in rotating motion. The devices 24 now pull the wrapping sheet 18 off the supply device or reel 28. The wrapping sheet 18 approaches the bale 16 between the rollers 20, during which process it is supported by the guiding device 40.

When the device 14 functions properly, the wrapping sheet 18 is seized and conveyed by the bale 16, causing the bale 16 to become wrapped with the wrapping sheet 18 through its own rotation.

The first sensor 42 downstream from the wrapping sheet feed location 21 now detects, for example optically, mechanically or in a different fashion, whether the wrapping sheet 18 is present on the bale 16 and, thus, whether the wrapping process started properly. If the sensor 42 detects that no wrapping sheet 18 is present on the bale 16, the sensor 42 supplies a corresponding signal to the control or regulating unit ECU. The regulating unit can now suspend the wrapping operation and for example stop the bale 16 from rotating or stop the devices 24 from pulling further wrapping sheet 18 off the supply device 28. Beyond that, it can be provided that the malfunction is indicated to an operator, for example by means of a display or another visual or also acoustic signal, to allow the operator to stop the wrapping operation.

If the sensor 42 supplies a signal that shows that the bale wrapping operation has started properly, the process will continue. Subsequently, the second sensor 44 detects whether the bale 16 has been wrapped entirely with a first layer of the wrapping sheet 18. If this is the case, the bale wrapping operation continues. The end of this operation is then determined in the conventional fashion, for example, after a specified duration or by setting a specific wrapping sheet length. The determination of the wrapping sheet length may be determined by one of the sensors 42 or 44, as described previously, or an additional sensor could be provided, which records, for example, the number of revolutions of the bale 16 or the supply device 28.

If the second sensor 44 detects that no wrapping sheet 18 is present on the bale 16, a corresponding signal is transmitted to the control or regulating device ECU, which proceeds in accordance with a corresponding signal provided by the first sensor 42.

After properly concluding or ending the wrapping process, the severing device 26 is operated to cut the wrapping sheet, and the wrapped bale 16 can be ejected from the baling chamber 12 of the baling press 10 in the conventional manner.

Having described the preferred embodiment, it will become apparent that various modifications can be made without departing from the scope of the invention as defined in the accompanying claims.

What is claimed is:

1. In combination with a baling machine including a bale-forming arrangement defining a baling chamber in which a bale is formed, a device for wrapping the bale with a wrapping sheet including a supply of wrapping sheet, and feed elements that feed the wrapping sheet through a wrapping sheet feed location of said baling chamber to the bale so that the rotating bale cooperates with said bale-forming arrangement to cause a length of said wrapping sheet to be carried along by, and wrapped around, a circumferential surface of said bale the improvement comprising: means for sensing the presence of the wrapping sheet on the bale while in the baling chamber.

2. The baling machine, as defined in claim 1, wherein said sensing means is provided downstream from said wrapping sheet feed location.

3. The baling machine, as defined in claim 1, wherein said sensing means is provided upstream from said wrapping sheet feed location.

4. The baling machine, as defined in claim 1, wherein said sensing means includes at least two sensors for sensing the presence of said wrapping sheet at respective locations downstream and upstream of said wrapping sheet feed location.

5. The baling machine, as defined in claim 1, and further including a control arrangement operative for controlling at least one of the supply of wrapping sheet to said bale or a rotation of said bale as a function of a sensor signal of said sensing means.

6. The baling machine, as defined in claim 5, wherein said control arrangement includes an electronic control unit (ECU); and said sensing means working in conjunction with said ECU.

7. The baling machine, as defined in claim 1, wherein said sensing means is one of an optical sensor, an ultrasonic sensor, a proximity sensor, an infrared sensor or a mechanical sensor.

* * * * *